(12) United States Patent
Arsalan et al.

(10) Patent No.: US 12,492,614 B2
(45) Date of Patent: Dec. 9, 2025

(54) MAGNETIC COUPLING TO TRANSFER TORQUE ACROSS HERMETIC CHAMBER WALLS

(71) Applicants: SAUDI ARABIAN OIL COMPANY, Dhahran (SA); Wireless Instrumentation Systems AS, Trondheim (NO)

(72) Inventors: Muhammad Arsalan, Dhahran (SA); Jarl André Fellinghaug, Leinstrand (NO); Henrik Clayborough, Trondheim (NO); Stian Marius Hansen, Trondheim (NO)

(73) Assignees: Saudi Arabian Oil Company, Dhahran (SA); Wireless Instrumentation Systems AS, Trondheim (NO)

( * ) Notice: Subject to any disclaimer, the term of this patent is extended or adjusted under 35 U.S.C. 154(b) by 421 days.

(21) Appl. No.: 17/991,768

(22) Filed: Nov. 21, 2022

(65) Prior Publication Data

US 2024/0167366 A1    May 23, 2024

(51) Int. Cl.
*E21B 41/00* (2006.01)
*F03B 13/02* (2006.01)
*H02K 7/18* (2006.01)

(52) U.S. Cl.
CPC .......... *E21B 41/0085* (2013.01); *F03B 13/02* (2013.01); *H02K 7/1823* (2013.01)

(58) Field of Classification Search
CPC ....... E21B 41/0085; F03B 13/02; H02K 1/02; H02K 7/1823; H02K 49/106; H02K 5/124; H02K 5/132
See application file for complete search history.

(56) References Cited

U.S. PATENT DOCUMENTS

| 6,672,409 | B1 | 1/2004 | Dock et al. |
| 7,057,316 | B2 | 6/2006 | Spring et al. |
| 7,434,634 | B1 * | 10/2008 | Hall ................... E21B 41/0085 175/107 |
| 9,206,672 | B2 | 12/2015 | Cooley et al. |
| 9,874,075 | B2 | 1/2018 | Disantis et al. |

(Continued)

OTHER PUBLICATIONS

International Search Report and Written Opinion for Application No. PCT/US2023/034914 dated Feb. 16, 2024.

*Primary Examiner* — Brad Harcourt
(74) *Attorney, Agent, or Firm* — Bracewell LLP; Constance G. Rhegergen; Keith R. Derrington (57) ABSTRACT

Systems and methods for providing power to a device of a downhole tool within a subterranean well during production operations include an energy harvesting system located within a tubular. The energy harvesting system has a turbine assembly with a turbine rotary member rotating relative to a turbine housing. A turbine magnetic array has a plurality of turbine magnets arranged in a ring shape. A power generator assembly has an input shaft assembly operable to provide a rotational energy to a power generator. A generator magnetic array of the input shaft assembly has a plurality of generator magnets arranged in a ring shape. A turbine sleeve surrounds the input shaft assembly, and forms a sealed barrier between the input shaft assembly and the turbine assembly. The turbine sleeve is formed entirely of a non-magnetic material.

22 Claims, 5 Drawing Sheets

(56) References Cited

U.S. PATENT DOCUMENTS

| | | |
|---|---|---|
| 2005/0200210 A1 | 9/2005 | Kotsonis et al. |
| 2008/0047753 A1 | 2/2008 | Hall et al. |
| 2008/0308318 A1* | 12/2008 | Moore ................... E21B 4/18 |
| | | 175/51 |
| 2015/0034294 A1 | 2/2015 | Miles et al. |
| 2016/0017693 A1 | 1/2016 | Winslow et al. |
| 2016/0102529 A1 | 4/2016 | Disantis et al. |
| 2017/0271971 A1 | 9/2017 | Riemay et al. |
| 2018/0320482 A1 | 11/2018 | Agnihotri et al. |
| 2020/0149372 A1* | 5/2020 | Hunter ............... E21B 41/0085 |
| 2020/0300083 A1* | 9/2020 | Fellinghaug ............ E21B 47/14 |
| 2023/0053504 A1* | 2/2023 | McGuire ............ E21B 41/0085 |
| 2023/0243241 A1* | 8/2023 | Fenocchi ................ F03B 13/02 |
| | | 290/54 |

* cited by examiner

MAGNETIC COUPLING TO TRANSFER TORQUE ACROSS HERMETIC CHAMBER WALLS

BACKGROUND OF THE DISCLOSURE

1. Field of the Disclosure

The present disclosure relates to downhole power generation in hydrocarbon production operations, and more specifically, the disclosure relates to magnetic couplings for transferring torque in a system for hydrocarbon production.

2. Description of the Related Art

During the production of fluids from a subterranean formation, downhole tools can be located within the subterranean well to assist with the production operations. Certain devices of a downhole tool can utilize electric power to operate. Some current hydrocarbon developments utilize power cables that extend from the earth's surface to deliver electric power to downhole devices. However, power cables can be inefficient and unreliable over long distances. In alternate current hydrocarbon developments, batteries can be used to power the downhole devices. However, batteries have a limited life.

In other alternate current hydrocarbon developments, electric power can be generated downhole for delivery to the devices of the downhole tool that use electric power to operate. As an example, the energy from the flow of fluids can be harvested and rotational energy can be transformed into electrical power.

SUMMARY OF THE DISCLOSURE

In some current downhole turbine systems for energy harvesting, fluid ingress past worn or ineffective seals and into the power generator can be problematic. Such fluid ingress can occur, for example, at the location of the transfer of torque from the turbine blade to the power generator. The conventional solution for this is to use a polished shaft with a sealing member to seal the harsh downhole fluids from the electronic vessel. However, these type of dynamic sealings have a limited useful life and can be prone to failure.

Systems and methods of this disclosure include an apparatus comprising two matched magnetic assemblies to transfer torque through a hermetically sealed barrier. The magnetic assemblies can be formed of samarium cobalt and arranged in a Halbach array. The magnetic assemblies can be separated by a non-magnetic material such as a barrier formed of Inconel® 718, MP35N®, or polyether ether ketone (PEEK). The magnetic array allows for the transfer of torque between two isolated domains, without any physical interaction, removing the need for a shaft with a rotary seal.

In an embodiment of this disclosure, a system for providing power to a device of a downhole tool within a subterranean well during well operations includes a tubular extending into the subterranean well. The tubular provides a fluid flow path for the delivery of fluids in any direction between a subterranean formation associated with the subterranean well, and an earth's surface. The downhole tool is positioned within the subterranean well, the downhole tool having the device that is operable by the provided power. An energy harvesting system is located within the tubular. The energy harvesting system includes a turbine assembly with a central axis. The turbine assembly has a turbine housing extending from a stay vane to a turbine sleeve. The turbine housing is static relative to the stay vane and the turbine sleeve. A turbine rotary member rotates relative to the turbine housing. A fore jewel bearing is positioned between the turbine rotary member and the stay vane. The fore jewel bearing provides for rotation of the turbine rotary member relative to the stay vane. An aft jewel bearing is positioned between the turbine rotary member and the turbine sleeve. The aft jewel bearing provides for rotation of the turbine rotary member relative to the turbine sleeve. A turbine magnetic array has a plurality of turbine magnets arranged in a ring shape. The energy harvesting system further includes a power generator assembly. The power generator assembly has a generator housing secured to the turbine sleeve. The generator housing is static relative to the turbine sleeve. The generator housing has an inner cavity and a power generator is located within the inner cavity. An input shaft assembly is operable to provide a rotational energy to the power generator. A generator magnetic array of the input shaft assembly has a plurality of generator magnets arranged in a ring shape. The turbine housing includes a plurality of flow outlets spaced circumferentially around the turbine housing radially outward of the turbine magnetic array. Each of the plurality of flow outlets is an axially extending opening through a sidewall of the turbine housing. The turbine sleeve surrounds the input shaft assembly, and forms a sealed barrier between the input shaft assembly and the turbine assembly. The turbine sleeve is formed entirely of a non-magnetic material.

In alternate embodiments, the turbine sleeve can be formed of Inconel® 718, MP35N®, or polyether ether ketone (PEEK). The plurality of turbine magnets can be arranged in a turbine Halbach array, and the plurality of generator magnets can be arranged in a generator Halbach array. The fore jewel bearing can include a fore cylindrical bearing pin extending between the turbine rotary member and a ring shaped stay vane bearing cavity of the stay vane. The aft jewel bearing can include an aft cylindrical bearing pin extending between the turbine rotary member and a ring shaped sleeve bearing cavity of the turbine sleeve.

In other alternate embodiments, the device of the downhole tool can be selected from a group consisting of a downhole gauge, a downhole valve, a downhole flow control device, and a downhole actuator. The plurality of turbine magnets and the plurality of generator magnets can be formed of high temperature Neodymium or samarium cobalt (SmCo). The turbine assembly can include a turbine blade extending radially outward and a ring shaped turbine shroud secured to a radially outward end of the turbine blade. The turbine blade and turbine shroud can rotate relative to the turbine housing.

In an alternate embodiment of this disclosure, a method for providing power to a device of a downhole tool within a subterranean well during well operations includes extending a tubular into the subterranean well. The downhole tool is positioned within the subterranean well, the downhole tool having the device that is operable by electric power. Fluids are delivered in any direction between a subterranean formation associated with the subterranean well and the earth's surface through the tubular. The power is provided to the device of the downhole tool with an energy harvesting system located within the tubular. The energy harvesting system includes a turbine assembly with a central axis. The energy harvesting system includes a turbine housing extending from a stay vane to a turbine sleeve. The turbine housing and stay vane are static relative to the turbine sleeve. A turbine rotary member rotates relative to the turbine housing. A fore jewel bearing is positioned between the turbine rotary member and the stay vane. The fore jewel bearing provides for rotation of the turbine rotary member relative to the stay vane. An aft jewel bearing is positioned between the turbine rotary member and the turbine sleeve. The aft jewel bearing provides for rotation of the turbine rotary member relative to the turbine sleeve. A turbine magnetic array has a plurality of turbine magnets arranged in a ring shape. The energy harvesting system further includes a power generator assembly. The power generator assembly has a generator housing secured to the turbine sleeve. The generator housing is static relative to the turbine sleeve. The generator housing has an inner cavity and a power generator is located within the inner cavity. An input shaft assembly is operable to provide a rotational energy to the power generator. A generator magnetic array has a plurality of generator magnets arranged in a ring shape. The generator magnetic array circumscribes the generator magnetic array. The turbine housing includes a plurality of flow outlets spaced circumferentially around the turbine housing radially outward of the turbine magnetic array. Each of the plurality of flow outlets is an axially extending opening through a sidewall of the turbine housing. The turbine sleeve surrounds the input shaft assembly, and forms a sealed barrier between the input shaft assembly and the turbine assembly. The turbine sleeve is formed entirely of a non-magnetic material.

In alternate embodiments, the method can further include forming the turbine sleeve with Inconel® 718. In another embodiment, the method can further include forming the turbine sleeve with MP35N®. In yet another embodiment the method can further include forming the turbine sleeve with polyether ether ketone (PEEK). The plurality of turbine magnets can be arranged in a turbine Halbach array, and the plurality of generator magnets can be arranged in a generator Halbach array. The fore jewel bearing can include a fore cylindrical bearing pin, and the method can further include extending the fore cylindrical bearing pin between the turbine rotary member and a ring shaped stay vane bearing cavity of the stay vane. The aft jewel bearing can include an aft cylindrical bearing pin, and the method can further include extending the aft cylindrical bearing pin between the turbine rotary member and a ring shaped sleeve bearing cavity of the turbine sleeve.

In other alternate embodiments, the device of the downhole tool can be selected from a group consisting of a downhole gauge, a downhole valve, a downhole flow control device, and a downhole actuator. The plurality of turbine magnets and the plurality of generator magnets can be formed with high temperature samarium cobalt (SmCo) or high temperature resistant Neodymium magnets. The method can alternately further include rotating a turbine blade and turbine shroud relative to the turbine housing, where the turbine assembly can include the turbine blade extending radially outward and the turbine shroud can be a ring shaped member secured to a radially outward end of the turbine blade.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a," "an," and "the" include plural references unless the context clearly indicates otherwise.

As used, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
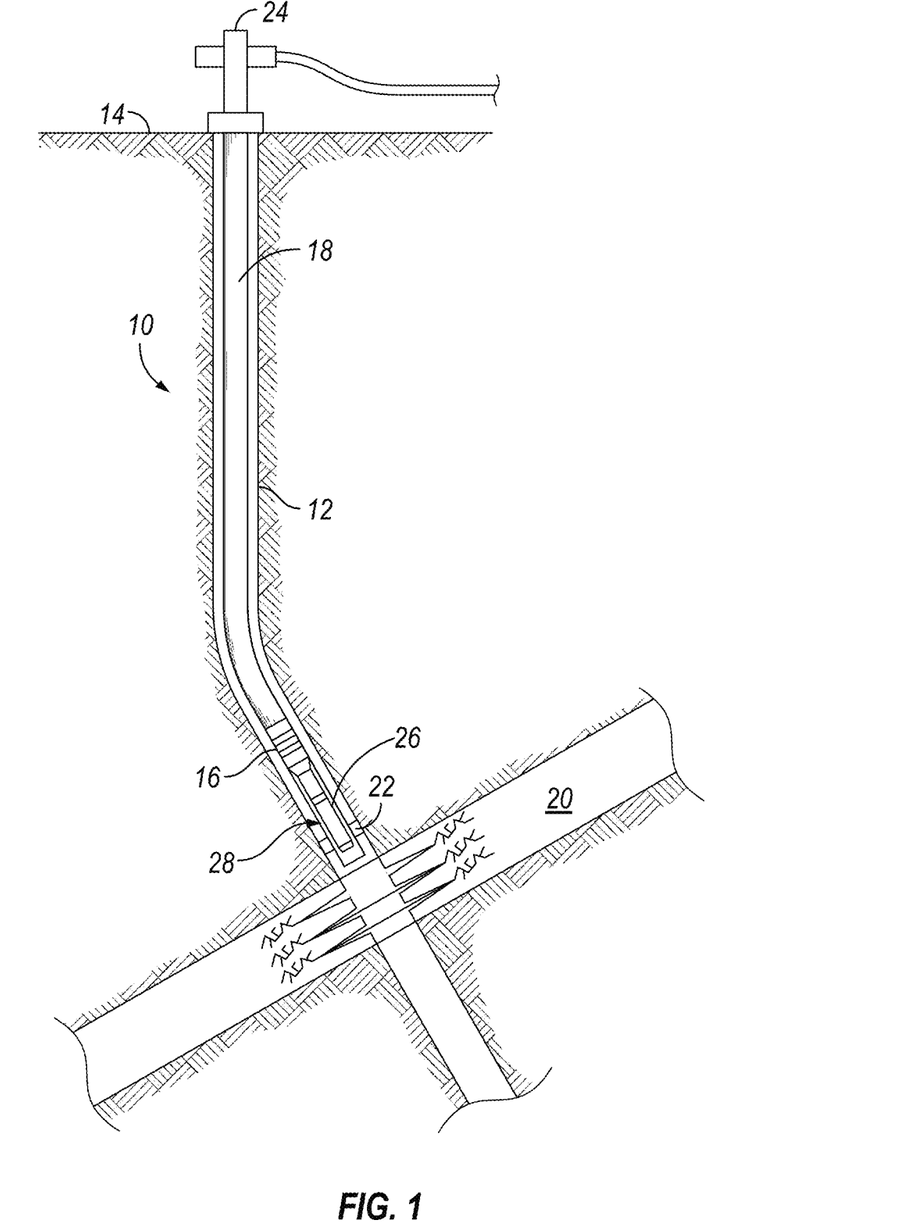
FIG. 1 is a section view of a subterranean well with an energy harvesting system, in accordance with an embodiment of this disclosure.

Looking at FIG. 1, subterranean well 10 can have wellbore 12 that extends to an earth's surface 14. Subterranean well 10 can be an offshore well or a land based well and can be used for producing fluids, such as producing hydrocarbons from subterranean hydrocarbon reservoirs, or injecting fluids down to the reservoirs. Downhole tool 16 can be located within wellbore 12. In the embodiment of FIG. 1, downhole tool 16 is located within tubular 18.

Tubular 18 extends into subterranean well 10. Tubular 18 provides a fluid flow path for the delivery of fluids in any direction between subterranean formation 20 associated with subterranean well 10, and earth's surface 14. As an example, tubular 18 provides a fluid flow path for the delivery of fluids produced from subterranean formation 20 associated with subterranean well 10, or for the delivery of fluids that are being injected into subterranean formation 20. In one embodiment, a production packer 22 circumscribes the tubular 18 and seals the annular space between an outer diameter surface of the tubular 18 and an inner diameter surface of subterranean well 10. In alternate embodiments there is no production packer.

Fluids in the subterranean formation 20 can communicate with subterranean well 10 by way of perforations into subterranean formation 20. When included, production packer 22 isolates the annulus portion of the subterranean well 10 to divert any fluid flow into the tubular 18.

Downhole tool 16 can include device 26 that is that is operable by electric power. Device 26 can be, as an example, a downhole gauge or sensor, a downhole active valve, a flow control device, an actuator, or a combination of such devices. Energy harvesting system 28 can be used to generate the electric power required for operation of device 26. Energy harvesting system 28 can be located within tubular 18 and can utilize the flow of fluids through tubular 18 to generate power.

Figure 2:
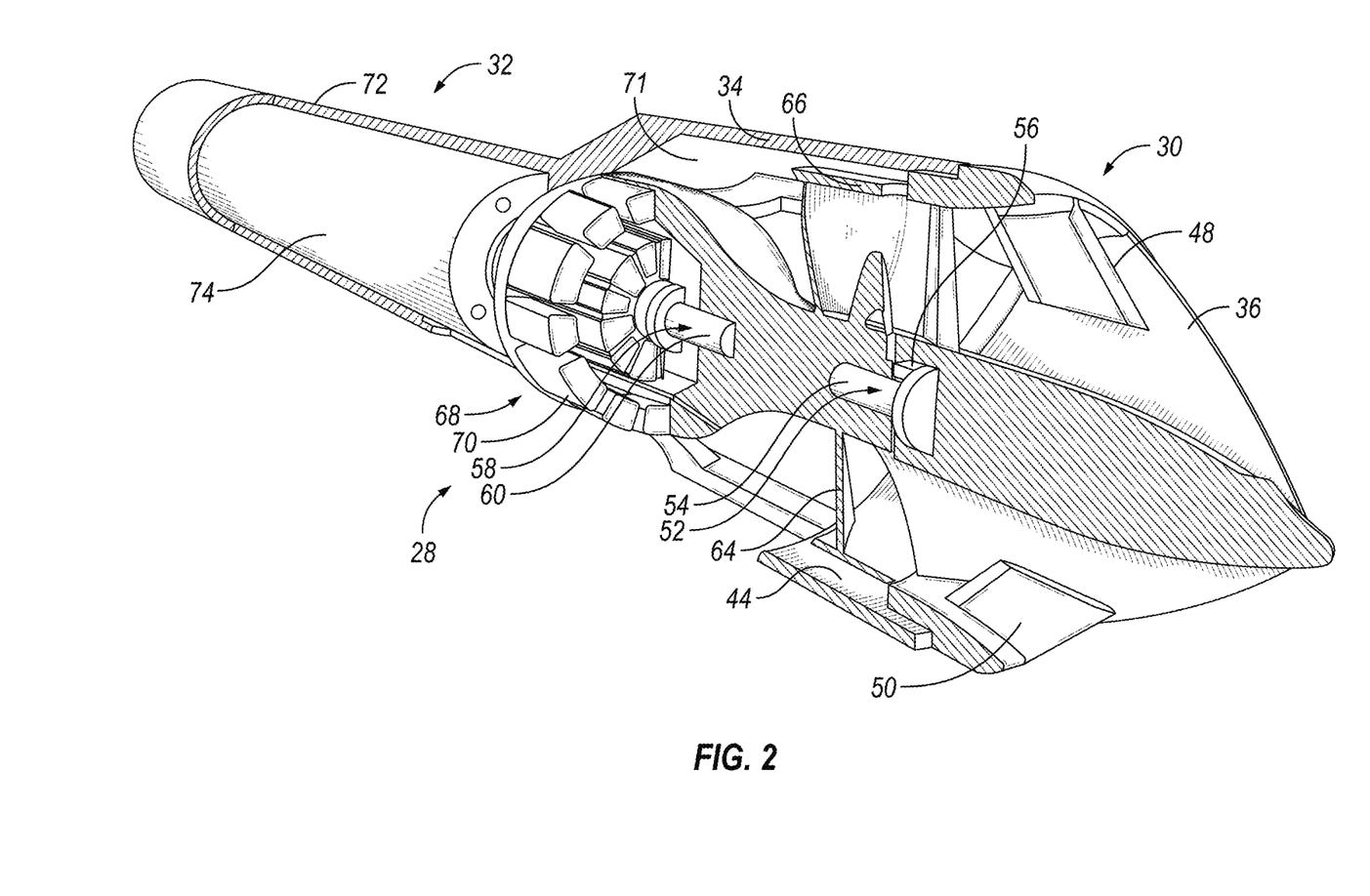
FIG. 2 is a perspective partially sectioned view of an energy harvesting system, in accordance with an embodiment of this disclosure.
Figure 3:
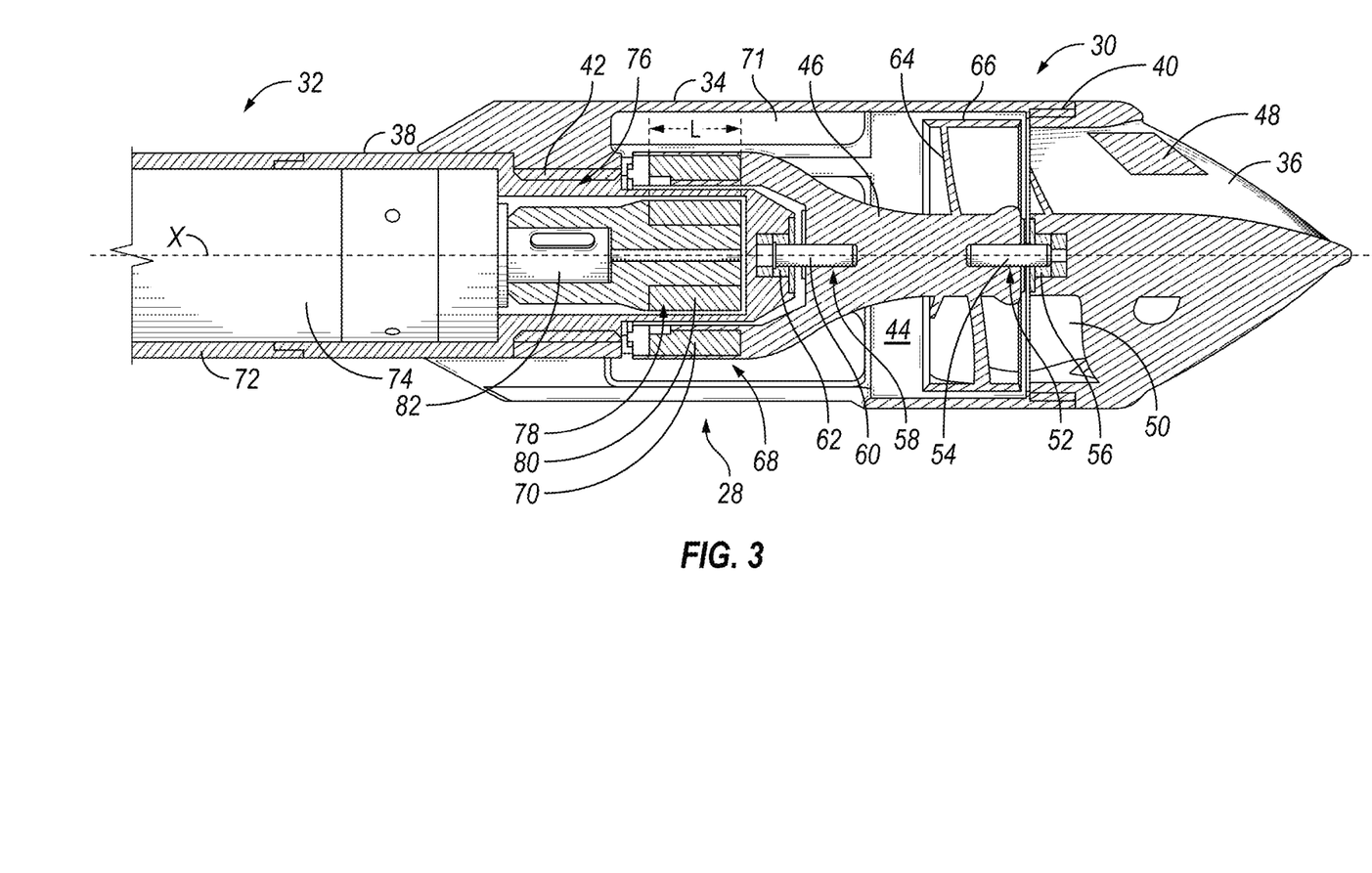
FIG. 3 is a section view of an energy harvesting system, in accordance with an embodiment of this disclosure.

Looking at FIGS. 2-3, energy harvesting system 28 includes turbine assembly 30 and power generator assembly 32. Turbine assembly 30 has central axis X. Turbine assembly 30 includes turbine housing 34. Turbine housing 34 extends from stay vane 36 to turbine sleeve 38. Turbine housing 34 is static relative to stay vane 36 and turbine sleeve 38. Turbine housing 34 is secured to stay vane 36 and turbine sleeve 38 in a manner that prevents relative movement between turbine housing 34, stay vane 36, and turbine sleeve 38. In the example embodiment of FIG. 3, turbine housing 34 is secured to stay vane 36 with threaded connection 40 and turbine housing 34 is secured to turbine sleeve 38 with aft threaded coupling 42.

Turbine housing 34 includes housing cavity 44. Housing cavity 44 is an open space that houses turbine rotary member 46. Turbine rotary member 46 rotates relative to turbine housing 34, stay vane 36, and turbine sleeve 38.

Stay vane 36 is located at a terminal fore end of energy harvesting system 28. Stay vane 36 can be a generally conically shaped member. Stay vane 36 can include flow inlets 48 that extend through an outer surface of the conical portion of stay vane 36, providing a flow path to an open base end of the generally conical; member. Stay blades 50 within flow stay vane 36 are fixed blades within stay vane 36. Stay blades 50 are static relative to stay vane 36. Stay blades 50 guide the fluid from external of energy harvesting system 28 through stay vane 36 and into housing cavity 44.

Turbine rotary member 46 is suspended within housing cavity 44 with fore and aft bearings. Fore jewel bearing 52 is positioned between turbine rotary member 46 and stay vane 36. Fore jewel bearing 52 provides for rotation of turbine rotary member 46 relative to stay vane 36, as well as the transfer of any forces between turbine rotary member 46 and stay vane 36. Fore jewel bearing 52 includes fore cylindrical bearing pin 54 extending between turbine rotary member 46 a ring shaped stay vane bearing cavity 56 of stay vane 36.

In the embodiment shown in FIGS. 2-3, the fore jewel bearing 52 design is a "pin, olive ring and end stone" design. Cylindrical bearing pin 54 is fixed on one end, in this embodiment of the invention, on the turbine rotary member 46, and suspended on the olive ring for radial support, and the end stone for axial support (for reverse thrust forces). In another embodiment the aft jewel bearing 58 design is a pivot design. In one embodiment, the jewel bearing pin is made of stainless steel, and the olive ring and end stone is made of ruby. In another embodiment, the jewel bearing pin is made of a tungsten carbide material, and the olive ring and end stone is made of sapphire, in another embodiment the pin, olive ring and end stone is made of synthetic diamonds, such as a polycrystalline diamond (PCD)

Aft jewel bearing 58 is positioned between turbine rotary member 46 and turbine sleeve 38. Aft jewel bearing 58 provides for rotation of turbine rotary member 46 relative to turbine sleeve 38, as well as the transfer of any forces between turbine rotary member 46 and turbine sleeve 38. Aft jewel bearing 58 includes aft cylindrical bearing pin 60 extending between turbine rotary member 46 and a ring shaped sleeve bearing cavity 62 of turbine sleeve 38.

In the embodiment shown in FIGS. 2-3, the aft jewel bearing 58 design is a "pin, olive ring and end stone" design. Cylindrical bearing pin 60 is fixed on one end, in this embodiment of the invention, on the turbine rotary member 46, and suspended on the olive ring for radial support, and the end stone for axial support (for thrust forces). In another embodiment the aft jewel bearing 58 design is a pivot design. In one embodiment, the jewel bearing pin is made of stainless steel, and the olive ring and end stone is made of ruby. In another embodiment, the jewel bearing pin is made of a tungsten carbide material, and the olive ring and end stone is made of sapphire, in another embodiment the pin, olive ring and end stone is made of synthetic diamonds, such as polycrystalline diamond (PCD)

Turbine rotary member 46 includes turbine blade 64. Turbine blade 64 extends radially outward from turbine rotary member 46. Turbine shroud 66 is a ring shaped member that is secured to a radially outward end of turbine blade 64. Turbine blade 64 rotates as fluids move past turbine blade 64. Turbine blade 64 and turbine shroud 66 are static relative to turbine rotary member 46 so that as turbine blade 64 rotates, turbine shroud 66 and turbine rotary member 46 are rotated.

Turbine rotary member 46 further includes turbine magnetic array 68. Turbine magnetic array 68 has a plurality of turbine magnets 70 arranged in a ring shape. Turbine magnetic array 68 is fixed within the body of turbine rotary member 46 so that as turbine rotary member 46 rotates, turbine magnetic array 68 also rotates. The turbine magnets 70 are separated and sealed from the harsh downhole fluid and environments, and in this embodiment of the invention the turbine magnetic array 68 is laser beam welded (LBW) shut inside the body of the turbine rotary member 46. The reason for using LBW method is because conventional arc or plasma welding techniques cannot be used this closed to a high strength magnetic field because the magnetic field will divert and warp the ionized gas. The same applies for Electron Beam Welding techniques, where the energized electron beam will be warped and deflected by the strong magnetic field. Optical welding techniques such as LBW is an applicable method for hermetically sealing strong magnetic assemblies.

Turbine housing 34 includes a plurality of flow outlets 71 spaced circumferentially around turbine housing 34. Flow outlets 71 are located radially outward of turbine magnetic array 68. Each of the plurality of flow outlets 71 are elongated openings through a sidewall of turbine housing 34. Each of the plurality of flow outlets 71 extend axially along turbine housing 34. In the section of turbine housing 34 that includes flow outlets 71, the sum of the surface area that are openings of flow outlets 71 is greater than the sum of the surface area of the structure of turbine housing 34.

Flow outlets 71 provide for the flow of fluids out of turbine housing 34, with minimal to no impediment by structural features of turbine housing 34. The location and size of flow outlets 71 further reduce possible eddy current losses compared to a design that has more structure of turbine housing 34 radially outward of turbine magnetic array 68.

Power generator assembly 32 includes generator housing 72. Generator housing 72 is secured to turbine sleeve 38 and is static relative to turbine sleeve 38. Generator housing 72 can be a tubular shaped member with an inner cavity. Power generator 74 is located within the inner cavity of generator housing 72. Power generator 74 can be used to convert a rotational energy into electric energy, which in turn is used to operate device 26 of downhole tool 16 (FIG. 1). Input shaft assembly 76 provides the rotational energy to electric generator 74.

Power generator 74 can be, for example, an electric generator. Alternately, power generator 74 can be a hydraulic pump, a gas compressor or other downhole device that is magnetically coupled to the turbine assembly 32. In other alternate embodiments, a sensing device can be part of the magnetic coupling, such as a meter that measures rotations per minute, a torque meter, or a logic device such as a revolutions counter.

Input shaft assembly 76 includes generator magnetic array 78. Generator magnetic array 78 has a plurality of generator magnets 80 arranged in a ring shape. Generator shaft 82 of input shaft assembly extends axially outward from power generator 74. Generator shaft 82 is attached to power generator 74 so that as generator magnetic array 78 rotates, generator shaft 82 also rotates to provide rotational energy to power generator 74.

Generator magnetic array 78 and turbine magnetic array 68 are axially aligned and co-axial. In the example embodiment of FIGS. 2-3, turbine magnetic array 68 circumscribes generator magnetic array 78. In alternate embodiments, generator magnetic array 78 can circumscribe turbine magnetic array 68. Due to constricted space in a downhole environment, having a bell shaped outer magnetic assembly with poles that match up with an internal barrel shaped magnetic assembly provides an efficient use of such limited space.

As turbine magnetic array 68 is rotated by the flow of fluids past turbine blade 64, the magnetic interaction between turbine magnetic array 68 and generator magnetic array 78 will cause generator magnetic array 78 to rotate. The length L of generator magnetic array 78 and turbine magnetic array is directly proportional to the maximum torque provided by the magnetic system. The maximum torque provided by the interaction between generator magnetic array 78 and turbine magnetic array 68 can be increased by extending the length L of generator magnetic array 78 and turbine magnetic array 68.

Figure 4:
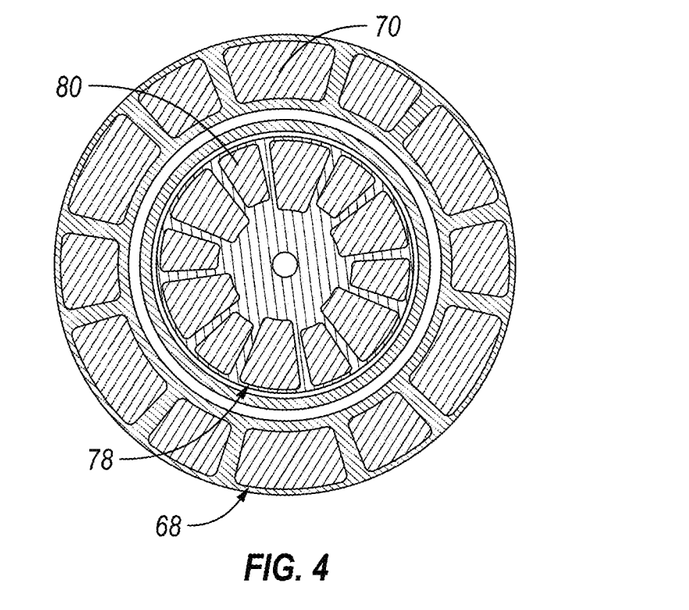
FIG. 4 is a section view of a turbine magnetic array and a generator magnetic array, in accordance with an embodiment of this disclosure.
Figure 5:
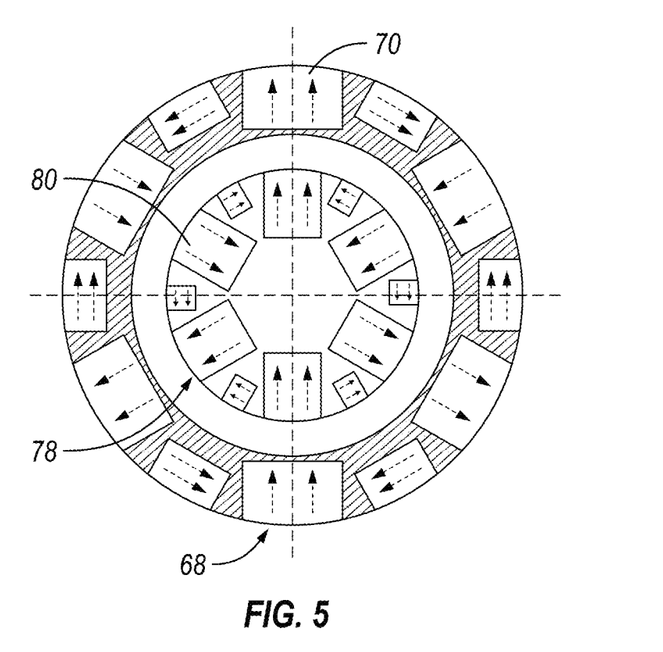
FIG. 5 is a schematic section view of a turbine magnetic array and a generator magnetic array, in accordance with an embodiment of this disclosure.

Looking at FIGS. 4-5, the plurality of generator magnets 80 of generator magnetic array 78 are arranged in a Halbach array to augment the magnetic field radially outwards toward the surrounding turbine magnetic array 68, while reducing the radially inwards field to near zero. In embodiments where the downhole temperatures are elevated to a temperature that would degrade permanent magnets formed of common traditional magnetic materials over time, the plurality of generator magnets 80 of generator magnetic array 78 can be formed of samarium cobalt (SmCo) or high temperature resistant Neodymium magnets.

The plurality of turbine magnets 70 of turbine magnetic array 68 are arranged in a Halbach array to augment the magnetic field radially inwards to generator magnetic array 78, while reducing the radially outwards field to near zero. In embodiments where the downhole temperatures are elevated to a temperature that would degrade permanent magnets formed of common traditional magnetic materials over time, the plurality of turbine magnets 70 of turbine magnetic array 68 can be formed of samarium cobalt (SmCo).

A Halbach array will augment the magnetic field between the generator magnetic array 78, and the turbine magnetic array 68. This will also minimize the magnitude of the "leaked" magnetic field radially outside and inside the magnetic coupling. A Halbach arrays is achieved by rotating the pattern of magnetization as seen in FIG. 5.

Figure 6:
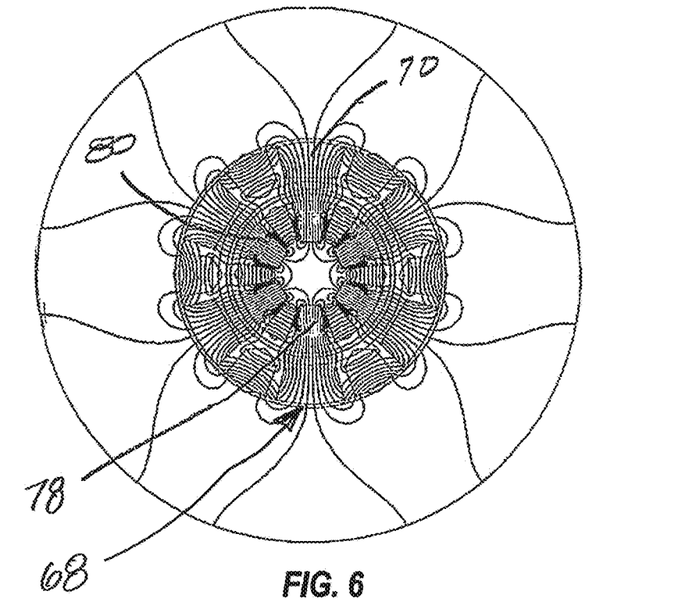
FIG. 6 is a section view of an aligned turbine magnetic array and a generator magnetic array showing magnetic field lines, in accordance with an embodiment of this disclosure.
Figure 7:
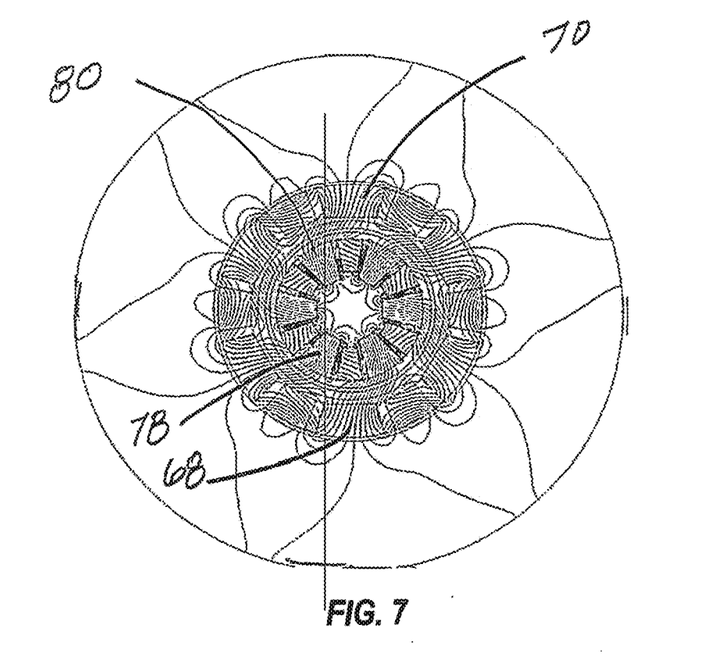
FIG. 7 is a section view of a turbine magnetic array and a generator magnetic array, with a 30 degree slip angle, showing magnetic field lines, in accordance with an embodiment of this disclosure.

Looking at FIGS. 6-7, although magnetic assemblies transfer torque or forces, similar to a mechanical coupling, the transfer of torque with magnetic assemblies is not accomplished by a physical mechanical coupling and the assembly can experience a slip. A "slip" between the two assemblies occurs when the relative rotational position of generator magnetic array 78 rotates relative to the position of turbine magnetic array 68. The maximum slip angle depends on the number of pole pairs. For example, if there is one pole pair assembly, the maximum slip angle is 180 degrees. At the maximum slip angle, the net torque is 0, as the magnetic fields are cancelling out. At ½ maximum slip angle is the maximum net torque achieved, and in a 1 pole pair setup this will be at 90 degrees slip angle. If the magnetic coupling is loaded by more than maximum net torque, the coupling will break, or skip one engagement with the other array, and if the net torque continues above the limit, the coupling will keep breaking every time. When the torque load is reduced below the limit, the coupling will engage and effectively transfer torque again. To reduce the amount of slip angle before maximum torque, the number of pole pairs can be increased. As an example, in a 2 pole pair setup, a maximum torque will be at 45 degrees, whereas in a 3 pole pair setup, as shown in FIGS. 4 and 5, the maximum torque will occur at 30 degrees.

Looking at FIG. 7, as a maximum net torque is approached, the maximum effective slip angle is achieved. When the slip angle is increased further, the magnetic poles will not be in the paired region anymore, and they will start opposing each other until forced into the paired region once again. If this behavior continues, the two assemblies are virtually disconnected and relatively little force or torque is transferred from one assembly to the other. This slip phenomenon can determine the maximum torque transferable by the assembly.

Looking at FIG. 3, turbine sleeve 38 allows for the transfer of torque between turbine magnetic array 68 and generator magnetic array 78 without the need for dynamic sealing. The use of turbine sleeve 38 allows for the transfer of the rotation of turbine blade 64 to rotation of generator shaft 82 without physical contact between turbine blade 64 and generator shaft 82.

Turbine sleeve 38 surrounds input shaft assembly 76. Turbine sleeve 38 forms a hermetically sealed barrier between input shaft assembly 76 and turbine assembly 30. Turbine sleeve 38 is formed entirely of a non-magnetic material. The thickness of the non-magnetic material of turbine sleeve 38 can be minimized to minimize any eddy current losses.

In an example embodiment, turbine sleeve 38 is formed of Inconel® 718. The desired material characteristic for the turbine sleeve is a very low magnetic permeability, and very low electrical conductivity to minimize eddy current losses. Eddy currents occur in a conductive material when voltages are induced by a changing magnetic field.

Turbine sleeve 38 can alternately be made of MP35N® (UNS R30035) which has a lower electrical conductivity, for the transfer of a rotating magnetic field, and also has a higher strength than Inconel® 718. By using higher strength material, turbine sleeve 38 can be made thinner which further improves the performance for the magnetic coupling due to reduced eddy current losses, and a closer gap between outer and inner magnetic assemblies.

Embodiments described in this disclosure therefore provide systems and methods that include two matched magnetic assemblies to transfer torque through a hermetically sealed barrier. High temperature magnets, such as magnets formed of samarium cobalt, can be arranged in separate Halbach arrays. The magnet assemblies are separated by a non magnetic alloy barrier. Systems and methods of this disclosure enable the transfer of torque between two isolated domains, without any physical interaction, thus removing the need for a shaft with a rotary sealing.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for providing power to a device of a downhole tool within a subterranean well during well operations, the system including:
   a tubular extending into the subterranean well, the tubular providing a fluid flow path for the delivery of fluids in any direction between a subterranean formation associated with the subterranean well, and an earth's surface;
   the downhole tool positioned within the subterranean well, the downhole tool having the device that is operable by the provided power;
   an energy harvesting system located within the tubular, the energy harvesting system including:
      a turbine assembly with a central axis and having:
         a turbine housing extending from a stay vane to a turbine sleeve, the turbine housing being static relative to the stay vane and the turbine sleeve;
         a turbine rotary member, the turbine rotary member rotating relative to the turbine housing;
         a fore jewel bearing positioned between the turbine rotary member and the stay vane, the fore jewel bearing providing for rotation of the turbine rotary member relative to the stay vane;
         an aft jewel bearing positioned between the turbine rotary member and the turbine sleeve, the aft jewel bearing providing for rotation of the turbine rotary member relative to the turbine sleeve; and
         a turbine magnetic array having a bell shape and rotationally coupled with the turbine rotary member, the turbine magnetic array having a plurality of turbine magnets, a first set of the turbine magnets oriented with poles that are radial to the central axis, a second set of the turbine magnets oriented with poles that are tangential to the central axis, the turbine magnets each comprising a permanent magnet and being sequentially positioned so that a turbine magnet of the second set is disposed between adjacent turbine magnets of the first set, and where poles of adjacent turbine magnets in the first set are oppositely directed, and where poles of adjacent turbine magnets in the second set are oppositely directed;
      a power generator assembly having:
         a generator housing secured to the turbine sleeve, the generator housing static relative to the turbine sleeve, where the generator housing has an inner cavity and a power generator is located within the inner cavity;
         an input shaft assembly rotationally coupled to the power generator; and
         a generator magnetic array having a barrel shape and rotationally coupled with the input shaft assembly and that comprises generator magnets arranged in a ring shape, a first set of the generator magnets oriented with poles that are radial to the central axis, a second set of the generator magnets oriented with poles that are tangential to the central axis, the generator magnets each comprising a permanent magnet and sequentially positioned so that a generator magnet of the second set is disposed between adjacent generator magnets of the first set, and where poles of adjacent generator magnets in the first set are oppositely directed, and where poles of adjacent generator magnets in the second set are oppositely directed, the generator magnets magnetically coupled with the turbine magnets and rotatable with rotation of the turbine magnets, so that the input shaft assembly rotates in response to rotation of the turbine rotary member; where
   the turbine housing includes a plurality of flow outlets spaced circumferentially around the turbine housing radially outward of the turbine magnetic array, each of the plurality of flow outlets being an axially extending opening through a sidewall of the turbine housing;
   the turbine sleeve surrounds the input shaft assembly, and forms a sealed barrier between the input shaft assembly and the turbine assembly; and
   the turbine sleeve is formed entirely of a non-magnetic material.

2. The system of claim 1, where the turbine sleeve is formed of a material selected from the group consisting of Inconel® 718 and MP35N®.

3. The system of claim 1, where the turbine magnetic array has poles that match up with poles of the generator magnetic array.

4. The system of claim 1, where the turbine sleeve is formed of polyether ether ketone (PEEK).

5. The system of claim 1, where the plurality of turbine magnets are arranged in a turbine Halbach array, and where the plurality of generator magnets are arranged in a generator Halbach array.

6. The system of claim 1, where the fore jewel bearing includes a fore cylindrical bearing pin extending between the turbine rotary member and a ring shaped stay vane bearing cavity of the stay vane.

7. The system of claim 1, where the aft jewel bearing includes an aft cylindrical bearing pin extending between the turbine rotary member and a ring shaped sleeve bearing cavity of the turbine sleeve.

8. The system of claim 1, where the device of the downhole tool is selected from a group consisting of a downhole gauge, a downhole valve, a downhole flow control device, and a downhole actuator.

9. The system of claim 1, where the plurality of turbine magnets and the plurality of generator magnets comprise Neodymium.

10. The system of claim 1, where the plurality of turbine magnets and the plurality of generator magnets comprise samarium cobalt (SmCo).

11. The system of claim 1, where the turbine assembly includes a turbine blade extending radially outward and a ring shaped turbine shroud secured to a radially outward end of the turbine blade, the turbine blade and turbine shroud rotating relative to the turbine housing.

12. A method for providing power to a device of a downhole tool within a subterranean well during well operations, the method including:
extending a tubular into the subterranean well;
positioning the downhole tool within the subterranean well, the downhole tool having the device that is operable by the provided power;
delivering fluids in any direction between a subterranean formation associated with the subterranean well and an earth's surface through the tubular;
providing the power to the device of the downhole tool with an energy harvesting system located within the tubular, the energy harvesting system including:
a turbine assembly with a central axis and having:
a turbine housing extending from a stay vane to a turbine sleeve, the turbine housing and the stay vane are static relative to the turbine sleeve;
a turbine rotary member, the turbine rotary member rotating relative to the turbine housing;
a fore jewel bearing positioned between the turbine rotary member and the stay vane, the fore jewel bearing providing for rotation of the turbine rotary member relative to the stay vane;
an aft jewel bearing positioned between the turbine rotary member and the turbine sleeve, the aft jewel bearing providing for rotation of the turbine rotary member relative to the turbine sleeve; and
a turbine magnetic array having a bell shape, the turbine magnetic array having a plurality of turbine magnets arranged in a ring shape, a first set of the turbine magnets oriented with poles that are radial to the central axis, a second set of the turbine magnets oriented with poles that are tangential to the central axis, the turbine magnets sequentially positioned so that a turbine magnet of the second set is disposed between adjacent turbine magnets of the first set, and where poles of adjacent turbine magnets in the first set are oppositely directed, and where poles of adjacent turbine magnets in the second set are oppositely directed;
a power generator assembly having:
a generator housing secured to the turbine sleeve, the generator housing static relative to the turbine sleeve, where the generator housing has an inner cavity and a power generator is located within the inner cavity;
an input shaft assembly rotationally coupled to the power generator; and
a generator magnetic array having a barrel shape, the generator magnetic array having a plurality of generator magnets arranged in a ring shape, where the turbine magnetic array circumscribes and is magnetically coupled with the generator magnetic array, a first set of the generator magnets oriented with poles that are radial to the central axis, a second set of the generator magnets oriented with poles that are tangential to the central axis, the generator magnets sequentially positioned so that a generator magnet of the second set is disposed between adjacent generator magnets of the first set, and where poles of adjacent generator magnets in the first set are oppositely directed, and where poles of adjacent generator magnets in the second set are oppositely directed, so that rotation of the turbine assembly rotates the input shaft assembly and causes the power generator to generate electricity; where
the turbine housing includes a plurality of flow outlets spaced circumferentially around the turbine housing radially outward of the turbine magnetic array, each of the plurality of flow outlets being an axially extending opening through a sidewall of the turbine housing;
the turbine sleeve surrounds the input shaft assembly, and forms a sealed barrier between the input shaft assembly and the turbine assembly; and
the turbine sleeve is formed entirely of a non-magnetic material.

13. The method of claim 12, further including forming the turbine sleeve with a material selected from the group consisting of Inconel® 718 and MP35N®.

14. The method of claim 12, where the turbine magnetic array has poles that match up with poles of the generator magnetic array, the method further comprising increasing lengths of the turbine and generator magnetic arrays to increase torque transfer between the turbine and generator magnetic arrays.

15. The system of claim 12, where the turbine sleeve is formed of polyether ether ketone (PEEK).

16. The method of claim 12, further including arranging the plurality of turbine magnets are in a turbine Halbach array, and arranging the plurality of generator magnets in a generator Halbach array.

17. The method of claim 12, where the fore jewel bearing includes a fore cylindrical bearing pin, and the method further includes extending the fore cylindrical bearing pin between the turbine rotary member and a ring shaped stay vane bearing cavity of the stay vane.

18. The method of claim 12, where the aft jewel bearing includes an aft cylindrical bearing pin, and the method further includes extending the aft cylindrical bearing pin between the turbine rotary member and a ring shaped sleeve bearing cavity of the turbine sleeve.

19. The method of claim 12, where the device of the downhole tool is selected from a group consisting of a downhole gauge, a downhole valve, a downhole flow control device, and a downhole actuator.

20. The method of claim 12, further including forming the plurality of turbine magnets and the plurality of generator magnets with high temperature Neodymium.

21. The method of claim 12, where the plurality of turbine magnets and the plurality of generator magnets are formed of samarium cobalt (SmCo).

22. The method of claim 12, further including rotating a turbine blade and turbine shroud relative to the turbine housing, where the turbine assembly includes the turbine blade extending radially outward and the turbine shroud is a ring shaped member secured to a radially outward end of the turbine blade.

* * * * *